(12) United States Patent
Mankame et al.

(10) Patent No.: US 9,016,318 B2
(45) Date of Patent: Apr. 28, 2015

(54) MAGNETORHEOLOGICAL FLUID-BASED DEVICE AND METHOD FOR USE

(75) Inventors: Nilesh D. Mankame, Ann Arbor, MI (US); Alan L. Browne, Grosse Pointe, MI (US); John C. Ulicny, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 13/357,055

(22) Filed: Jan. 24, 2012

(65) Prior Publication Data

US 2013/0186473 A1 Jul. 25, 2013

(51) Int. Cl.
F15C 1/04 (2006.01)
F16F 9/53 (2006.01)
F16F 13/30 (2006.01)

(52) U.S. Cl.
CPC .............. *F16F 13/305* (2013.01); *F16F 9/537* (2013.01); *Y10S 137/909* (2013.01)

(58) Field of Classification Search
USPC ............... 137/806, 827, 909; 188/267, 267.1
See application file for complete search history.

(56) References Cited

U.S. PATENT DOCUMENTS

| | | | | |
|---|---|---|---|---|
| 2,607,542 A * | 8/1952 | Spillman | | 242/421.6 |
| 2,667,237 A * | 1/1954 | Rabinow | | 188/267 |
| 2,669,325 A * | 2/1954 | Raines | | 188/267 |
| 3,626,964 A * | 12/1971 | Van Fossen | | 138/45 |
| 5,632,361 A * | 5/1997 | Wulff et al. | | 188/267 |
| 2003/0075401 A1* | 4/2003 | Carlson | | 188/267 |
| 2005/0087408 A1* | 4/2005 | Namuduri et al. | | 188/267.1 |
| 2005/0150731 A1* | 7/2005 | Hitchcock et al. | | 188/267 |
| 2006/0016649 A1* | 1/2006 | Gordaninejad et al. | | 188/267 |
| 2007/0023244 A1* | 2/2007 | Carlson et al. | | 188/267 |
| 2010/0199519 A1* | 8/2010 | Battlogg | | 36/83 |
| 2010/0256791 A1* | 10/2010 | Spicer et al. | | 700/98 |
| 2010/0307601 A1* | 12/2010 | Gabriel et al. | | 137/13 |
| 2010/0307877 A1* | 12/2010 | Bose et al. | | 188/378 |

OTHER PUBLICATIONS

Dwivedi, R., et al. 2006.—Abstract Only—"Field feature detection and morphing-based process planning for fabrication of geometries and composition control for functionally graded materials." Proceedings of The Institution of Mechanical Engineers—Part B—Engineering Manufacture (Professional Engineering Publishing) 220, No. 10: p. 1647-1661.*

* cited by examiner

*Primary Examiner* — John K Fristoe, Jr.
*Assistant Examiner* — Seth W Mackay-Smith
(74) *Attorney, Agent, or Firm* — Mark S. Cohen; Pearl Cohen Zedek Latzer Baratz LLP

(57) ABSTRACT

A magnetorheological fluid-based device and method may include the use of magnetorheological (MR) fluid, a primary magnetic field to control the viscosity of the fluid, and a secondary magnetic field to reduce clumping of ferromagnetic particles.

9 Claims, 4 Drawing Sheets

MAGNETORHEOLOGICAL FLUID-BASED DEVICE AND METHOD FOR USE

FIELD OF THE INVENTION

The present invention is related to magnetorheological fluid-based devices including for example ferromagnetic particles suspended in a carrier fluid.

BACKGROUND

Many applications utilize magnetorheological (MR) fluids, including smart actuation systems, such as dampers, clutches, and isolators. MR fluids may be composed of magnetizable particles suspended in a carrier. Under an external magnetic field, the particles form chains or fibrils that impede the motion of the fluid, causing the fluid to exhibit a high apparent viscosity and reach a solid-like state. The yield stress, representing the strength of an MR fluid when reaching the solid-like state, may depend on the strength of the external magnetic field applied. MR fluids may be used when rapid changes in elastic and damping properties are required to maintain control of a machine, such as a vehicle.

When MR-based devices are in an off-state for a period of time without periodic mixing of the fluid, the magnetizable particles may settle, and because they may still retain some magnetism, they may become tightly bound or clumped. This may lead to clogging of the device and degradation of system performance. Further, the properties of the fluid may be more unpredictable when the device returns to an on-state. Some MR fluids include surfactants, such as detergents, emulsifiers or other polymer coated nanoparticles, to reduce surface tension of the fluid and mitigate clumping. However, the presence of other particles or substances in the MR fluids may reduce the maximum magnetic saturation of a fluid and thus weaken an MR fluid's yield stress.

SUMMARY

A magnetorheological fluid-based device and method may include the use of a magnetorheological fluid, a primary magnetic field controlling the viscosity of the fluid, and a secondary magnetic field to reduce the sedimentation rate of ferromagnetic particles in the fluid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
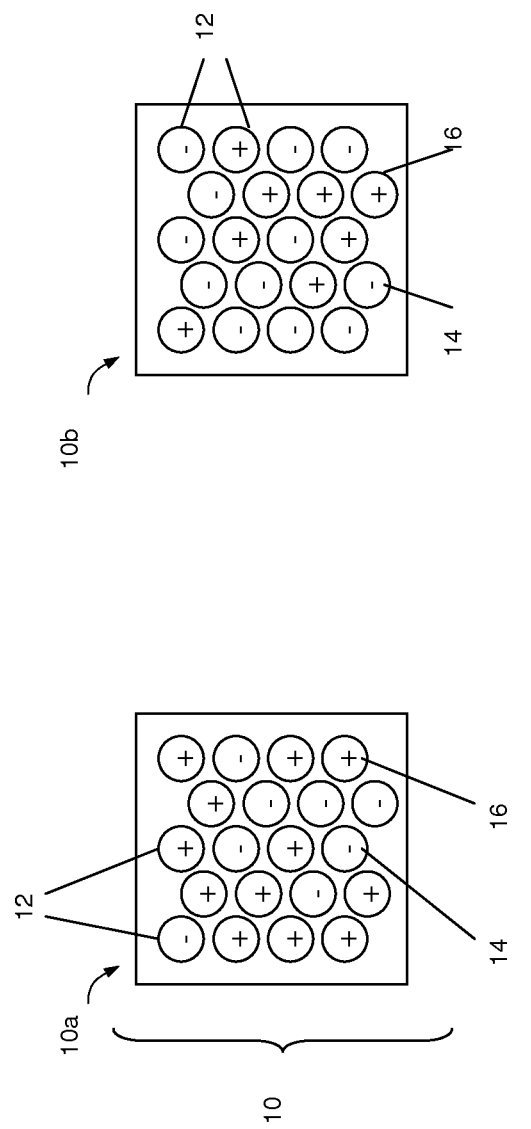
FIG. 1 is a diagram of a magnetic array according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

A magnetorheological (MR) fluid-based device may include MR fluid including ferromagnetic particles in a carrier fluid such as oil or water. An MR fluid-based device may have numerous applications in many fields and industries, including as shock absorbers for automobiles, motorcycles, or bicycles, energy damping systems for buildings in earthquake prone areas or any other systems where vibration or stroking force control is required, an example of the latter being in impact energy absorbers. The fluid's viscosity may be controlled by a primary magnetic field, where an increase in strength of the primary magnetic field applied to the fluid may increase the fluid's viscosity. Viscosity may be a measure of the fluid's flow resistance and may be best described in everyday terms as a fluid's "thickness". When a magnetic field is applied to an MR fluid, the ferromagnetic particles may form for example fibril structures that increase the viscosity or thickness of the MR fluid. High viscosity of a fluid or solid is also correlated to high shear or tensile stress, which is the amount of force required to deform a fluid's shape. If the primary magnetic field strength is high enough, the fluid may have viscosity that is near that of a solid and may be able to withstand large amounts of applied force without shearing. The direction of the primary magnetic field may be perpendicular to the direction of the MR fluid's flow. MR fluid may flow in any passage, shaft, valve or any similar compartment in a machine. When the device is in an on-state, a controllable magnetic field generator may apply or generate a primary magnetic field to the MR fluid. The primary magnetic field may have a variable strength that is controllable by the magnetic field generator. The MR fluid's viscosity may vary with the strength of the primary magnetic field. When the device is in an off-state, the primary magnetic field may be off or not applied. A secondary magnetic field may be applied to the MR fluid when the device is in an off-state, and is typically applied continuously but may be overshadowed by the primary magnetic field, when turned on. The secondary magnetic field may be weaker than the primary magnetic field's maximum strength so that the fluid has low viscosity during the device's off-state, but may also prevent, or reduce the rate of, sedimentation of the ferromagnetic particles. The secondary magnetic field may be generated by any configuration of weak (relative to the primary field) permanent magnets or magnetic arrays.

Sedimentation of ferromagnetic particles may be characterized by a settling of the ferromagnetic particles when the primary magnetic field is in an off-state. Particles in a liquid may naturally settle due to gravitational forces and the different densities between the particles and liquid. Ferromagnetic particles may be made of, for example, iron, nickel, cobalt, or their alloys. The MR fluid may contain any mixture or combination of these metals, or other compositional material. Ferromagnetic particles may be magnetized when an external magnetic field is applied to them, and they may retain some or a substantial amount of magnetism when the external magnetic field is removed. When ferromagnetic particles undergo settling, their retained magnetism may cause some magnetic attraction between particles and lead to clumping of the ferromagnetic materials into a hard, cake-like substance. This may cause clogging in the device or may decrease response time when the device switches from the off-state (when there is no generation of the primary magnetic field) to the on-state (when there is a generation of the primary magnetic field). Applying a weak (relative to the primary field) secondary magnetic field to the ferromagnetic particles that acts against gravitational forces may reduce the clumping effect of sedimentation, and keep the ferromagnetic material in suspension in the fluid. The weaker strength of the secondary magnetic field may cause weak polarization of the ferromagnetic particles, which may prevent the ferromagnetic particles from forming strong fibril structures within the fluid. In this way, the secondary magnetic field may further allow the MR fluid to have relatively low viscosity during the off-state.

When used herein, magnetism and magnetic field may be interchangeable terms that describe the magnetic moment, or force, that an object or region exerts on another object or region. While magnetism may particularly describe the way that an object's subatomic particles are aligned, an object's magnetism may also describe the magnetic field emitted by the object. A magnetic field may be described by a vector field describing magnetic moment, and may include a direction and a magnitude (e.g., an intensity or strength). Magnetic field vectors or field lines may be emitted from a magnetic pole (e.g., magnetic dipoles, monopoles). Regions of a material or object may be or may include magnetic dipoles. Magnetic dipoles may, for example, be positively and/or negatively magnetized regions (e.g., emitting magnetic fields) of varying magnitude or strength.

Magnetic fields may, for example, be generated using electromagnets, permanent magnets, ferromagnetic metals, spatially modulated magnetic field based devices, or other components or devices. A magnetic field may be spatially modulated, in that multiple adjacent magnetic fields (positive or negative) from an arrangement or array of magnetic sources create a close field of different magnetic polarizations and intensities. Spatially modulated magnetic fields may, for example, be created from an array of magnetic or electric field emission sources or magnetized regions in a material (e.g., a ferromagnetic metal). A magnet may, for example, be material or an object that emits or produces a magnetic field, which may be a vector field including a direction and a magnitude (e.g., an intensity or strength). A material (e.g., a ferromagnetic material, metal, or other type of material), object, or regions of a material or object may, for example, be positively, negatively, or neutrally magnetized. Spatially modulated magnet fields may, for example, include a unique arrangement, combination or array of positively and negatively magnetized fields in a material. Such an array may be arranged horizontally on a flat object, flat portion of an object, a surface or other portion (such as a curved surface or an interior portion) of an object, or a plane. Each of multiple magnetized regions (e.g., magnetic regions, maxels, or other regions) may, for example, be a positively or negatively polarized magnetic field emission source of a pre-determined intensity. A magnetic region may be a region of varying size, surface area (e.g., 1 millimeter (mm) or greater in diameter), or volume. Multiple positive or negative magnetically charged regions may be arranged in an array or pattern on or in a material. An array or pattern of magnetized regions may, for example, create a unique magnetic pattern, fingerprint or signature. The array of magnetized regions may, for example, be pre-selected, programmed, or determined to have desirable properties (e.g., with other materials or objects with an array of magnetic regions or other magnetic materials).

A magnetic array may, for example, generate higher near-field magnetic flux than a typical magnet due to the fact that positively magnetized regions (e.g., positive poles) are located next to or in close proximity to negatively magnetized regions (e.g., negative poles). The close proximity of positively charged regions and negatively charged regions may result in reduced far-field magnetic flux and increase near-field magnetic flux because a shortest path or path of least resistance between oppositely polarized magnetized poles may be reduced. As a result of greater near-field magnetic flux, magnetic force (e.g., attractive or repulsive magnetic force) between one magnetic array and another ferromagnetic object, or between two complementary magnetic arrays, may be concentrated in the near-field and drop dramatically with distance. Using magnetic arrays may reduce the effects of far-field magnetism acting on other magnetic components within a device.

The magnetic array may include any suitable configuration, arrangement, or grouping of positively and negatively magnetized regions. The magnetic array may, for example, include adjacent positively magnetized regions and adjacent negatively magnetized regions. The magnetic array may be configured in a way that generates a higher near-field magnetic flux, or, in another example, directs the magnetic field towards a ferromagnetic object. An array or pattern of magnetized regions may, for example, create a unique or relatively unique magnetic pattern, fingerprint or signature. The array of magnetized regions may, for example, be pre-selected, programmed, or determined to have desirable properties (e.g., with other materials or objects with an array of magnetic regions or other magnetic materials).

FIG. 1 is a diagram of a magnetic array according to embodiments of the present invention. Referring to FIG. 1, in some embodiments, a magnetic array 10 made of magnetic materials or components may generate a spatially modulated magnetic field. Spatially modulated magnetic field may, for example, be generated by an array 10 of magnetic or electric field emission sources or magnetized regions 12 in a material (e.g., a ferromagnetic metal, or a ring). A magnetic array 10 may, for example, include an arrangement and/or combination of magnetized regions 12 (e.g., maxels, magnetic dipole regions, or other regions). Magnetized regions 12 may include positively magnetized regions 16, negatively magnetized regions 14, or other types of magnetized regions. Each of multiple magnetized regions 12 may, for example, be a positively polarized magnetic field emission source 16 or negatively polarized magnetic field emission source 14 of predetermined magnitude (e.g., magnitude, strength, or intensity of magnetic field). A magnetic region 12 may be a region of any suitable size, surface area (e.g., sub millimeter (mm) or greater in diameter, or other dimensions), shape, or volume. Multiple positively magnetized regions 16 and negative magnetized regions 14 may be arranged in an array or pattern on a material (e.g., generating a spatially modulated magnetic field). Positively magnetized regions 16 and negatively magnetized regions 14 may, for example, be arranged in a grid, staggered grid, predetermined pattern (e.g., a spiral or other pattern), random pattern, or any other spatial arrangement. A magnetic array 10 may, for example, generate a unique magnetic field (e.g., a magnetic finger print or signature).

Spatially modulated magnetic fields generated by magnetic arrays 10 on two or more materials or objects may be defined or pre-determined such that the two magnetic fields and thus the materials may complement one another. Spatially modulated magnetic fields generated by magnetic arrays 10 on two or more materials may, for example, complement one another by generating an attractive, repulsive, or neutral magnetic force between the two materials. The strength or magnitude of the magnetic force between two magnetic arrays 10 may be a function of a distance between two materials and/or other parameters. The strength or magnitude of the magnetic force between a magnetic array 10 generating a spatially modulated magnetic field and another ferromagnetic material may be a function of a distance between the two materials and/or other parameters.

Magnetic arrays 10 may, for example, be predefined such that two objects are attracted so that the magnetic force moves the two objects to a predefined orientation relative to each other. Two materials (e.g., a first material and a second material) may be magnetically attracted in a predefined orientation if magnetic arrays 10 on each of the materials (e.g., magnetic array 10*a* on a first material and magnetic array 10*b* on a second material) are attracted when properly aligned. Magnetic arrays of two materials (e.g., magnetic array 10*a* and magnetic array 10*b*) may be attracted if positively magnetized regions 16 on first magnetic array 10*a*, when arranged in the pattern of array 10*a*, align with negatively magnetized regions 14 on second magnetic array 10*b*, when arranged in the pattern of array 10*b*, and negatively magnetized regions 14 on first magnetic array 10*a*, when arranged in the pattern of array 10*a*, align with positively charged regions 16 in second magnetic array 10*b*, when arranged in the pattern of array 10*b*. In some embodiments, attraction between array 10*a* and array 10*b* may be maximized when array 10*a* and array 10*b* are oriented so that corresponding complementary maxels on each are oriented opposite one another within the respective pattern on each array (e.g., the arrays line up or match). The magnitude of attractive force between magnetic arrays 10 of two materials (e.g., a first magnetic array 10*a* and a second magnetic array 10*b*) may, for example, be related to or be a function of a distance between two materials and/or other parameters. A magnetic attraction force may, for example, occur if two magnetic arrays 10 are within a threshold distance of one another. Two magnetic arrays 10 may, for example, be magnetically neutral or magnetically repulsive beyond or outside of a threshold distance. Similarly, a magnetic repulsive or repelling force may, in some embodiments, occur if two magnetic arrays 10 (e.g., a first magnetic array 10*a* and a second magnetic array 10*a*) have the same configuration and are within a threshold distance of one another.

Figure 2:
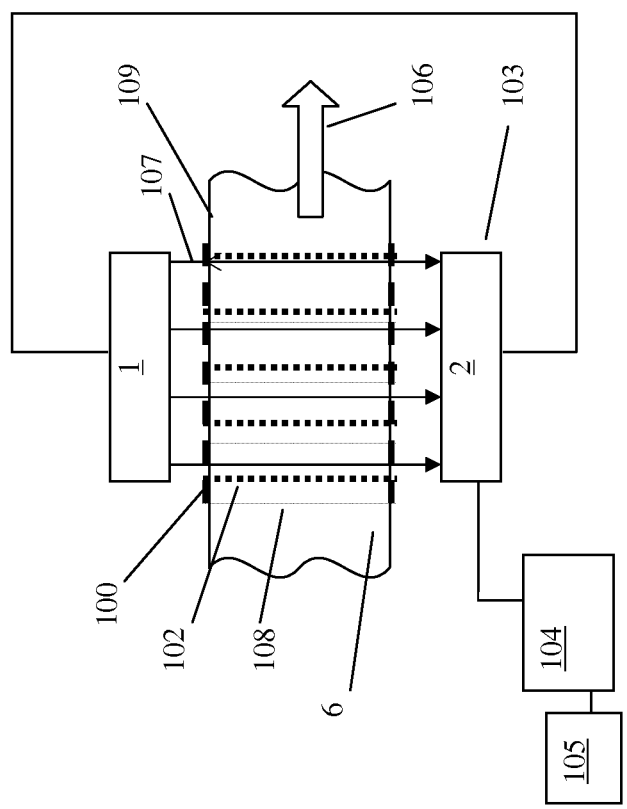
FIG. 2 is a diagram of a magnetorheological fluid-based device in an on-state according to an embodiment of the present invention.

FIG. 2 is a diagram of an MR fluid-based device in an on-state according to an embodiment of the present invention. During the on-state, a primary magnetic field 107 may be generated or applied across the MR fluid 6, for example perpendicular to the direction of the MR fluid's flow 106. The MR fluid 6 may be contained in a valve, flow passage, or any similar device including a conduit or cavity 109. The primary magnetic field 107 may be generated by a controllable magnetic field generator 103 that controls the strength of the primary magnetic field 107. In general, controllable magnetic field generator 103 may, for example, be any structure including one or more electromagnetic field coils, and magnetic poles, such as permanent magnets, adjacent to the coils. In FIG. 2, the magnetic poles are represented by 1 and 2, which may be opposite poles, such as north and south respectively, or vice versa, creating a magnetic moment or force between them. This magnetic moment may create the primary magnetic field 107. The primary magnetic field 107 may vary in magnitude or strength, and a processor or controller 104 connected to a memory 105 electrically coupled to the magnetic field generator 103 may control whether the device is in an on-state. The magnetic field generator 103 may control primary magnetic field's 107 strength, from a strength of zero up to a maximum strength. The MR fluid's 6 viscosity or thickness may vary with the strength of the primary magnetic field 107. The processor or controller 104 may receive information about the device's external environment, such as external vibrational effects or damping instructions for example, and read instructions from memory 105 to determine the strength of the primary magnetic field that should be applied. For example, in a vehicle's seat suspension application using MR fluid 6, a processor 104 may receive information about road conditions or velocity. The processor 104 may read instructions from memory 105 to determine the strength of the magnetic field to apply to a damping device so that mechanical energy from vibrational effects is dissipated into the MR fluid 6. The primary magnetic field 107 may exert a magnetic moment on ferromagnetic or ferrous particles 102 suspended in the carrier fluid 6, causing the ferromagnetic particles 102 to line up perpendicularly in a fibrile structure, for example against the direction of the MR fluid's flow 106, and/or in line with the primary magnetic field 107. The MR fluid's 6 viscosity may increase substantially with the strength of the primary magnetic field. When the device is in an on-state, a secondary magnetic field 108 may be present, generated by magnets 100 that are weaker than the magnets generating the primary magnetic field. Magnets 100 may generate a secondary magnetic field 108 that is weaker than the primary magnetic field 107 at its maximum strength or at less than its maximum strength. For example, in the on-state, the magnetic field generator may produce a primary magnetic field 107 at a maximum strength. The secondary magnetic field 108 may be weaker than the maximum strength of the primary magnetic field 107. In another example, the magnetic field generator may produce a primary magnetic field 107 at less than a maximum strength, but still at a strength that allows the MR fluid 6 to exhibit high viscosity and absorb external impact energy. The secondary magnetic field 108 may be weaker than the primary magnetic field 108 at this setting.

The secondary magnetic field 108 may be in a direction that is opposed to or aligned with (e.g., polarized in the same direction or opposite direction, respectively) the primary magnetic field 107, and/or the secondary magnetic field 108 may be a spatially modulated magnetic field generated by a magnetic array 10 (FIG. 1). The primary magnetic field 107, when active, may overcome the secondary magnetic field 108 so that the secondary magnetic field has an insubstantial effect on the ferromagnetic particles or the viscosity of the MR fluid 6.

Figure 3:
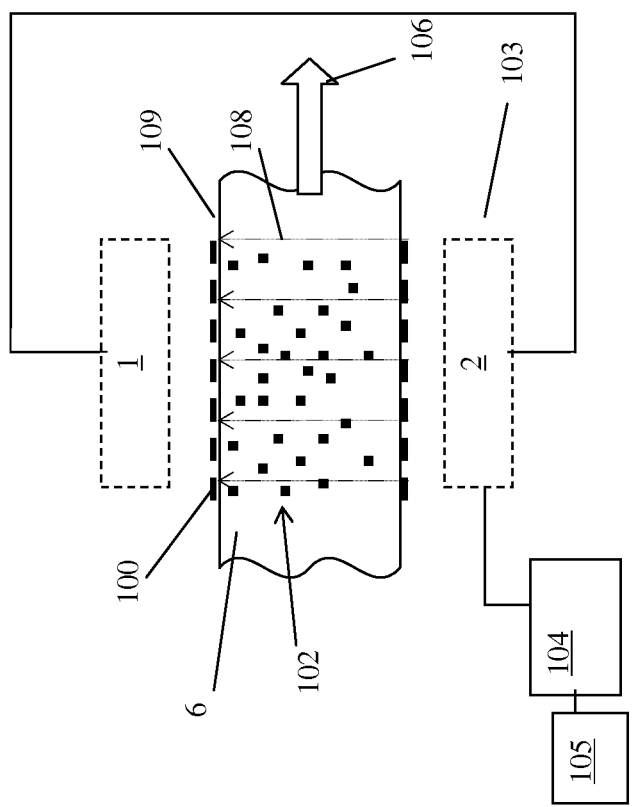
FIG. 3 is a diagram of a magnetorheological fluid-based device in an off-state according to an embodiment of the present invention.

FIG. 3 is a diagram of an MR fluid-based device in an off-state according to an embodiment of the present invention. A processor or controller 104 reading from a memory 105, or another device or circuit, may control the magnetic field generator 103 so that the primary magnetic field is not generated, and is thus turned off. A secondary magnetic field 108 may be present, generated by weak permanent magnets or magnetic arrays. The weaker magnitude of the secondary magnetic field 108 may have little or only a mild effect on ferromagnetic particles 102 suspended in an MR fluid 6, and the ferromagnetic particles 102 may remain suspended in the MR fluid 6 in a random distribution, exhibiting Brownian motion like most particles in any liquid, or the ferromagnetic particles 102 may line up more loosely as compared to when the primary magnetic field 107 is turned on. The MR fluid's 6 viscosity may remain low in the presence of the secondary magnetic field 108 and the absence of primary magnetic field 107 (FIG. 2). The low viscosity of the MR fluid 6 combined with weak alignment of ferromagnetic particles 102 may allow the MR fluid to have little flow resistance when the device is in an off-state, and a fast hardening response (due to the ferromagnetic particles 102 lining up in fibrile structures) when the primary magnetic field 107 is turned on from an off-state. The secondary magnetic field 108 may be generated by relatively weak permanent magnets 100 or magnetic arrays 10.

In some embodiments, the secondary magnetic field 108 is generated by an arrangement of weak permanent magnets 100 that may align or be arranged around a flow passage, conduit or cavity 109. The flow passage or cavity 109 may be any shape, and may include a straight passageway or a corner passageway. The permanent magnets 100 may be all of the same polarity, e.g. all of positive or north-facing polarity, or the permanent magnets 100 may have different or alternating polarities around the flow passage 109. For example, referring to FIG. 3, the permanent magnets may have alternating north-south-north polarity along the bottom of the flow passage 109, and the same configuration along the top of the flow passage 109. Alternatively, the top of the flow passage 109 may have an opposite and alternating polarity of south-north-south.

In other embodiments, the secondary magnetic field 108 is generated by an arrangement of magnetic arrays 10. The magnetic arrays 10 may include multiple adjacent positively magnetized regions 16 and negatively magnetized regions 14. Positively magnetized regions 16 and negatively magnetized regions 14 may generate or create a number of magnetic fields; the sum of the strengths of these fields may be less than the strength of the primary magnetic field 107. The magnetic arrays 10 may be aligned or arranged around a flow or passageway 109 in various suitable configurations. For example, a magnetic array 10 with a configuration of multiple adjacent positively and negatively magnetized regions 16 may be located on one side of the conduit or flow passage 109 and facing a magnetic array 10 with the opposite or complimentary configuration. The magnetic arrays 10 may generate a spatially modulated magnetic field of low magnitude that is concentrated in the magnetic arrays' 10 near field. If the flow passage, cavity or conduit 109 includes a corner passageway, the permanent magnets or magnetic arrays 10 may be strategically placed to maintain the flow of MR fluid 6 and prevent ferromagnetic particles 102 from sticking into crevices. For example, a corner passageway may include an inner and outer corner, and the MR fluid's flow may cause ferromagnetic particles 102 to tend to stick to the outer corner in the off-state. A secondary magnetic field 108 may be generated by a group of magnetic arrays 10 placed in the inner corner of the corner passageway, and the ferromagnetic particles 102 may line up loosely towards the inner corner, preventing clumping in the outer corner.

Figure 4:
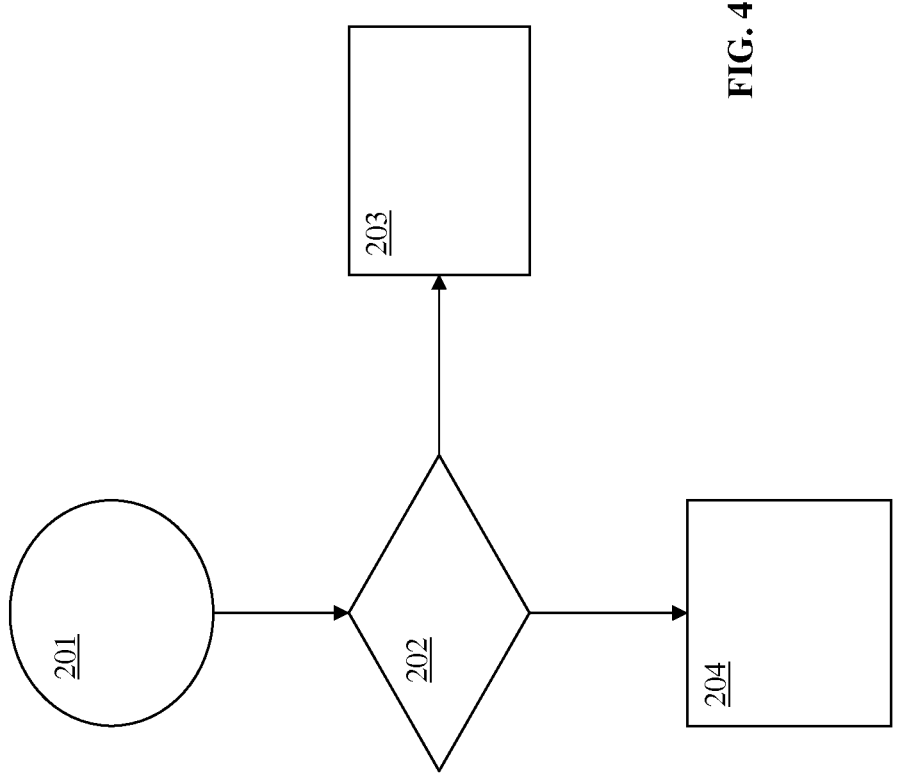
FIG. 4 is a flow chart of a method of maintaining magnetorheological fluid in a magnetorheological fluid-based device according to an embodiment of the present invention.

FIG. 4 is a flow chart for a method of maintaining magnetorheological fluid in a magnetorheological fluid-based device. Such a device may be as described in FIGS. 1-3, but a method as described herein may be used with other suitable devices. The MR fluid-based device may include MR fluid including ferromagnetic particles in a carrier fluid, flowing within a flow passage. The device may include a primary magnetic field that controls the viscosity of an MR fluid and a secondary magnetic field that reduces sedimentation of ferromagnetic particles suspended in an MR fluid. Starting at operation 201, a processor or controller may receive information about the device's external environment, such as external vibrational effects or damping instructions for example.

Operation 202 is a conditional operation that determines whether the primary magnetic field should be in an on-state or off-state. If the primary magnetic field should be in an on-state, in operation 203 a strong primary magnetic field is applied to MR fluid, for example perpendicular to the flow of the fluid. In operation 203, the secondary magnetic field may be present, but the primary magnetic field may overcome the secondary magnetic field so that the secondary magnetic field has insubstantial effect on the viscosity of the MR fluid and the ferromagnetic particles. If in operation 202 it is determined that the primary magnetic field should be in an off-state, in operation 204 the primary magnetic field is turned off, while the secondary magnetic field continues to be applied to the flow passage. Other operations or series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A magnetorheological device comprising,
   a magnetorheological fluid disposed in a conduit, the magnetorheological fluid comprising ferromagnetic particles in a carrier liquid;
   a controllable magnetic field generator configured to apply a primary magnetic field to the magnetorheological fluid so as to modulate its viscosity
   an array of magnetic regions permanently magnetized into a single body of ferromagnetic material, the array configured to apply a secondary magnetic field to the magnetorheological fluid so as to maintain the ferromagnetic particles in a fibril-free suspension in an absence of the primary magnetic field.

2. The magnetorheological fluid-based device of claim 1, wherein the carrier fluid includes oil or water.

3. The magnetorheological device of claim 2, wherein the array includes a regular pattern of magnetic regions in alternating polarizations.

4. The magnetorheological device of claim 2, wherein the array includes at least two magnetic regions of different magnetic strengths.

5. The magnetorheological device of claim 1, further comprising a processor configured to control the magnetic field generator.

6. A method of maintaining responsiveness of a magnetorheological device comprising:

providing a magnetorheological device having controllable magnetic field generator configured to apply a primary magnetic field to a magnetorheological liquid disposed in the device, the magnetorheological liquid having ferromagnetic particles disposed in a carrier liquid; and using an array of an array of magnetic regions permanently discrete magnetic regions permanently magnetized into a single body of ferromagnetic material to apply a secondary magnetic field to the magnetorheological liquid fluid so as to maintain the ferromagnetic particles in fibril-free suspension in an absence of the primary magnetic field.

7. The method of claim 6, wherein the carrier liquid includes oil or water.

8. The method of claim 7, wherein the array includes a regular pattern of magnetic regions in alternating polarizations.

9. The method of claim 7, wherein the array includes at least two magnetic regions of different magnetic strengths.

* * * * *